United States Patent
Medithe et al.

(10) Patent No.: US 12,309,617 B2
(45) Date of Patent: May 20, 2025

(54) NEIGHBOR RELATION CONFLICT PREDICTION

(71) Applicant: RAKUTEN MOBILE, INC., Tokyo (JP)

(72) Inventors: Madhukiran Medithe, Tokyo (JP); Suvindu Chinnam, Tokyo (JP); Manoj Kumar, Tokyo (JP); Petrit Nahi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 565 days.

(21) Appl. No.: 17/542,242

(22) Filed: Dec. 3, 2021

(65) Prior Publication Data

US 2023/0039510 A1 Feb. 9, 2023

Related U.S. Application Data

(60) Provisional application No. 63/229,039, filed on Aug. 3, 2021.

(51) Int. Cl.
| | |
|---|---|
| *H04L 12/00* | (2006.01) |
| *H04W 24/02* | (2009.01) |
| *H04W 24/10* | (2009.01) |
| *H04W 64/00* | (2009.01) |

(52) U.S. Cl.
CPC .......... *H04W 24/02* (2013.01); *H04W 24/10* (2013.01); *H04W 64/003* (2013.01)

(58) Field of Classification Search
CPC .... H04W 24/02; H04W 24/10; H04W 64/003
See application file for complete search history.

(56) References Cited

U.S. PATENT DOCUMENTS

| | | | | |
|---|---|---|---|---|
| 2014/0094176 | A1* | 4/2014 | Klein | H04W 16/14 455/436 |
| 2018/0279187 | A1* | 9/2018 | Zingler | H04W 24/02 |
| 2019/0230530 | A1* | 7/2019 | Henriksson | H04W 76/11 |
| 2020/0178161 | A1* | 6/2020 | Zeng | G06N 20/10 |
| 2021/0325550 | A1* | 10/2021 | Wigard | H04W 24/02 |

FOREIGN PATENT DOCUMENTS

CN 109995566 A * 7/2019

* cited by examiner

*Primary Examiner* — Noel R Beharry
*Assistant Examiner* — Lionel Preval
(74) *Attorney, Agent, or Firm* — HAUPTMAN HAM, LLP

(57) ABSTRACT

Neighbor relation conflict prediction is performed by operations including receiving, from a serving MCG of a terminal, a measurement report of the terminal including a plurality of signal measurements associated with an SCG represented by a PCI and an ARFCN, identifying an unlisted SCG among the plurality of signal measurements, identifying one or more nearby MCG within a threshold distance of the serving MCG, counting a number of SCG in the NRT of each nearby MCG having the PCI and the ARFCN of the unlisted SCG, applying a classification model to the counted number of SCG and an MCG-PCI-ARFCN identifier representing the serving MCG, the PCI, and the ARFCN to obtain a binary value indicating whether provisioning the unlisted SCG with the serving MCG and the plurality of nearby MCG will result in PCI conflict.

20 Claims, 11 Drawing Sheets

NEIGHBOR RELATION CONFLICT PREDICTION

PRIORITY CLAIM AND CROSS-REFERENCE

This application claims priority to Provisional Application No. 63/229,039, filed Aug. 3, 2021, which is hereby incorporated by reference in its entirety.

BACKGROUND

In early adoption of 5G technology into existing cellular networks, such as by using E-UTRAN New Radio-Dual Connectivity (EN-DC) architecture, network environments are expected to undergo frequent changes. The number of available cells is expected to increase due to the frequency property and data offload of 5G cells. These changes are expected to result in neighbor relation tables, which include information for performing hand-offs to each of a number of nearby cells, being modified more frequently than before adoption of 5G technology. In addition, since the coverage area of the 5G cells is smaller than 4G cells, and the number of devices connected to networks is still steadily increasing, the number of handovers is expected to exponentially increase.

In early deployment of 5G, E-UTRAN supports Multiple Radio-Dual Connectivity (MR-DC) via EN-DC, in which a terminal is connected to one 4G cell (eNB) that acts as master node and one 5G cell (en-gNB) that acts as a secondary node. The eNB is connected to the Evolved Packet Core (EPC) via an S1 interface and to the en-gNB via an X2 interface. The en-gNB might also be connected to the EPC via an S1-U interface and other en-gNBs via an X2-U interface.

Because the coverage of 5G cells is limited compared with 4G cells, more 5G cells are used to cover an area than 4G cells. If a terminal moves from the coverage area of one cell to that of another, the terminal connects to the other cell and disconnects from the first cell. This procedure is called handover. For this handover to occur, the neighbor relation should be provisioned in the individual neighbor relation table of the eNB.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
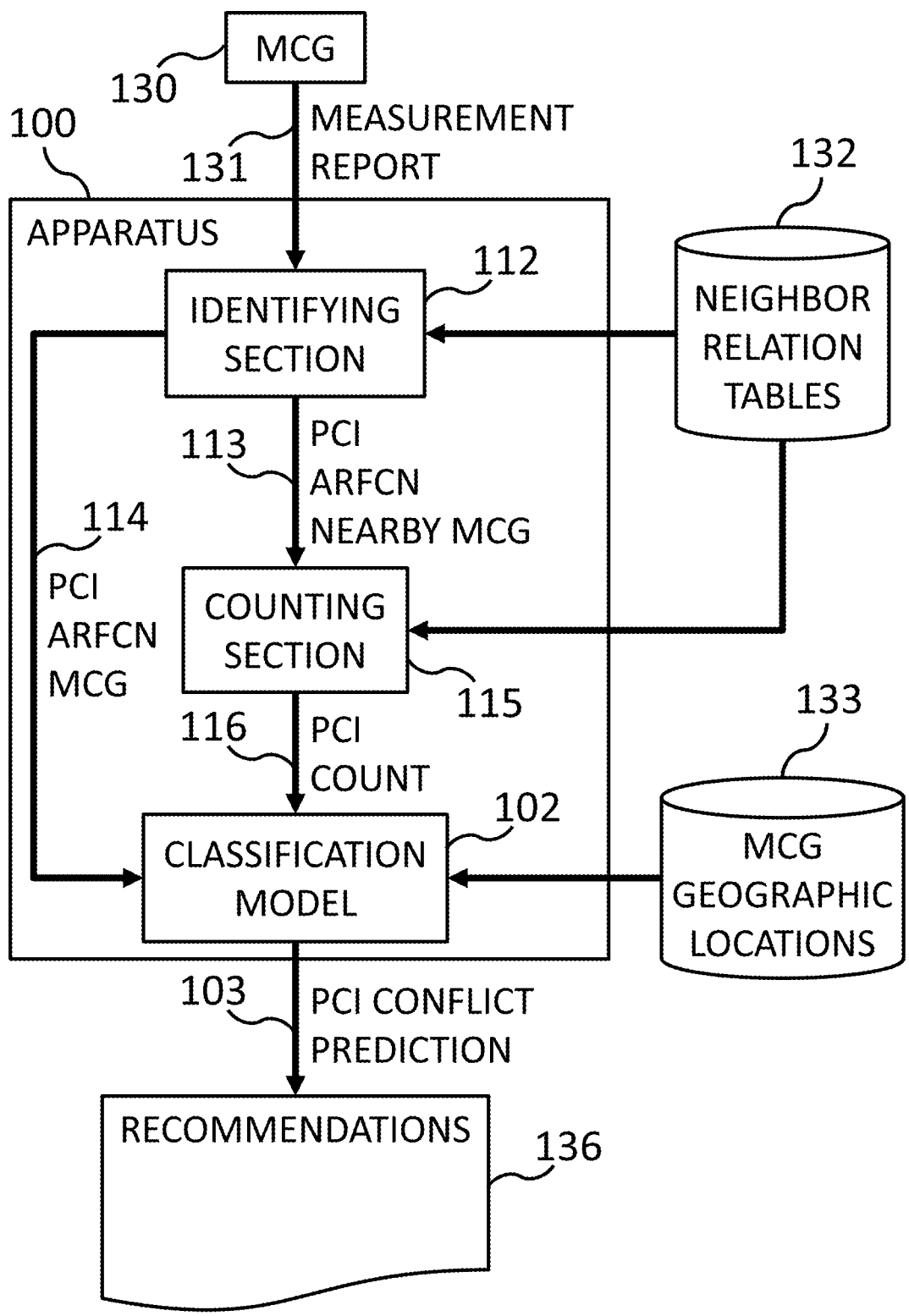
FIG. 1 is a schematic diagram of data flow for neighbor relation conflict prediction, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

At least some embodiments use ensemble machine learning to suggest addition of 5G cells to the neighbor relation tables of nearby cells, or to warn that such addition may result in Physical Cell Identifier (PCI) conflict.

In at least some embodiments, new neighboring 5G cells are found proactively, and suggestions for adding any newly found neighboring 5G cells to neighbor relation tables are issued upon predicting that no PCI conflict would be caused by such an addition.

According to certain standards, an existing neighbor cell relation from an anchor cell, or Master Cell Group (MCG), to a target cell, or Secondary Cell Group (SCG), uses the eNB (controlling the anchor cell) to know the Cell Global Identity (CGI) and PCI of the target cell, and to have an entry in the neighbor relation table for the anchor cell identifying the target cell. For each cell that the eNB has a neighbor relation, the neighbor relation table contains the Target Cell Identifier (TCI), which identifies the target cell.

In at least some embodiments, an eNB serving cell configured for neighbor relation conflict prediction instructs each connected terminal to perform measurements on neighbor cells, as a part of normal call procedure. In at least some embodiments, the network sends a Measurement Command (Measurement Control) to the terminal to perform detection and signal measurement of cells around the terminal. The terminal detects and measures the signal of nearby cells, and reports to the eNB serving cell that sent the measurement command. In at least some embodiments, neighbor relation conflict prediction is performed upon the reception of each measurement report. In at least some embodiments, the neighbor relation conflict prediction process starts in response to the terminal reporting a 5G PCI in the measurement report. In at least some embodiments, the frequency of the PCI is enhanced from the measurement ID reported by the terminal in the measurement report. In at least some embodiments, a check is made in the configuration of the network to understand if the en-gNB corresponding to the PCI and frequency is already present in the neighbor relation table of the eNB reported. If the relation already exists, the entry will be discarded, and the neighbor relation conflict prediction process will stop. Otherwise, the neighbor relation conflict prediction process will proceed. In response to detecting a 5G PCI from a measurement report, at least some embodiments verify whether the relation is already provisioned, and then perform neighbor relation conflict prediction before making a suggestion for addition or conflict into the neighbor relation table of the eNB as well as any nearby eNB.

In at least some embodiments, the first level of neighbor relation is provisioned in the initial configuration of system, such that the neighbor relation table of each MCG is initially provisioned with some known nearby 5G cells. In at least some embodiments, once the system is operational, further neighbor relation are able to be added through terminal assisted neighbor relation conflict prediction and eNB configuration update procedures over an X2AP interface. At least some embodiments evaluate the distance between various LTE cells.

In at least some embodiments, neighbor relation conflict prediction is performed in real time to capture and provision every neighbor reported by a terminal. In at least some embodiments, the network configuration is updated frequently to help prevent any conflicts and help ensure the right relation is being established for coverage.

FIG. 1 is a schematic diagram of data flow for neighbor relations conflict prediction, according to at least one embodiment of the present invention. The diagram includes an apparatus 100, an MCG 130, a database of neighbor relation tables 132, and a database of MCG geographic locations 133.

MCG 130 is a node of a cellular network. In at least some embodiments, MCG 130 operates in an EN-DC network in which MCG 130 is an eNB node configured for 4G LTE technology and MCG 130 facilitates connections to gNB nodes configured for 5G technology. In at least some embodiments, MCG 130 refers to a Neighbor Relation Table (NRT) listing nearby 5G cells supported by MCG 130, nearby 5G cells that are in conflict with MCG 130, and nearby 4G nodes provisioned for hand-off from MCG 130. In at least some embodiments, MCG 130 receives measurement reports from connected terminals to which MCG 130 is the serving MCG. In at least some embodiments, the measurement reports include, for each signal detected by the terminal, a signal strength measurement, a PCI, and an ARFCN. In at least some embodiments, MCG 130 forwards the measurement reports, such as measurement report 131, to apparatus 100.

Apparatus 100 includes an identifying section 112, a counting section 115, and a classification model 102. In at least some embodiments, apparatus receives measurement reports, such as measurement report 131, and outputs a list of recommendations 136, each recommendation includes information representing the PCI and ARFCN of the 5G cell, the serving MCG and nearby MCG, and an indication of whether to provision the 5G cell in the neighbor relation tables of the serving and nearby MCG or whether to note the 5G cell as having a "conflict" in the neighbor relation tables. In at least some embodiments, apparatus 100 is in communication with database of neighbor relation tables 132 and database of MCG geographic locations 133 through the cellular network or through another network, such as the Internet. In at least some embodiments, database of neighbor relation tables 132 is a constantly updated central source of configuration information about each cell in the cellular network, including neighbor relation tables. In at least some embodiments, database of MCG geographic locations 133 is a daily updated source of site level information about each cell in the cellular network, including geographic locations. In at least some embodiments, information may be retrieved from databases 132 and 133 by query for specific information, or by obtaining a full "dump" of the information, and then reviewing the information on apparatus 100.

Identifying section 112 is configured to identify new 5G cells by PCI and ARFCN, and also to identify MCG nearby a serving MCG. In at least some embodiments, identifying section 112 is configured to compare measurement reports with neighbor relation tables to identify any PCI and ARFCN combinations not found in the neighbor relation table of the serving MCG associated with the measurement report. In at least some embodiments, identifying section 112 is configured to retrieve neighbor relation tables of MCG from database of neighbor relation tables 132. In at least some embodiments, identifying section 112 is configured to output the PCI and ARFCN of any such unfounded combination along with the serving MCG identifier, such as PCI-ARFCN-NEARBY MCG 113 to counting section 115. In at least some embodiments, identifying section 112 is configured to identify any MCG that are nearby the serving MCG. In at least some embodiments, identifying section 112 refers to a table of nearby MCG. In at least some embodiments, identifying section 112 is configured to populate the table of nearby MCG by retrieving MCG geographic locations from database of MCG geographic locations 133. In at least some embodiments, identifying section 112 is configured to train a machine learning model to identify nearby MCG based on geographic coordinates, and populate the table of nearby MCG according to the results. In at least some embodiments, identifying section 112 is configured to output MCG identifiers for any nearby MCG, along with the PCI and ARFCN of any combination not found in the neighbor relation table of the serving MCG, such as PCI-ARFCN-MCG 114, to classification model 102.

Counting section 115 is configured to count existing 5G cells having the same PCI and ARFCN in the vicinity of a serving MCG. In at least some embodiments, counting section 115 is configured to count 5G cells appearing in neighbor relation tables of nearby MCG. In at least some embodiments, counting section 115 is configured to retrieve neighbor relation tables of nearby MCG from database of neighbor relation tables 132. In at least some embodiments, counting section 115 is configured to output a number of 5G cells having the same PCI and ARFCN, such as PCI count 116, configured for input into classification model 102.

Classification model 102 is a machine learning model trained to predict whether or not a PCI conflict will occur in response to provisioning a new 5G cell based on a PCI count. In at least some embodiments, classification model 102 is trained to predict based further on a geographic location. In at least some embodiments, classification model 102 receives geographic locations in the form of latitude and longitude from database of MCG geographic locations 133. In at least some embodiments, classification model 102 receives a concatenation of PCI count 116, latitude, and longitude as input. In at least some embodiments, classification model 102 receives a concatenation of PCI count 116, latitude, longitude, and frequency type, as input. In at least some embodiments, the frequency type is either Sub-6 or mmWAVE. In at least some embodiments, classification model 102 receives PCI-ARFCN-MCG 113 as an index value of the input. In at least some embodiments, classification model 102 outputs PCI conflict prediction 103, a binary value representing a prediction of whether or not a PCI conflict will occur in response to provisioning the serving MCG and any nearby MCG with the 5G cell associated with the PCI and ARFCN. In at least some embodiments, classification model 102 is a Support Vector Machine (SVM) classification model. In at least some embodiments, classification model 102 is trained by solving a primal optimization problem using the Limited-memory Broyden-Fletcher-Goldfarb-Shanno (LBFGS) algorithm.

Figure 2:
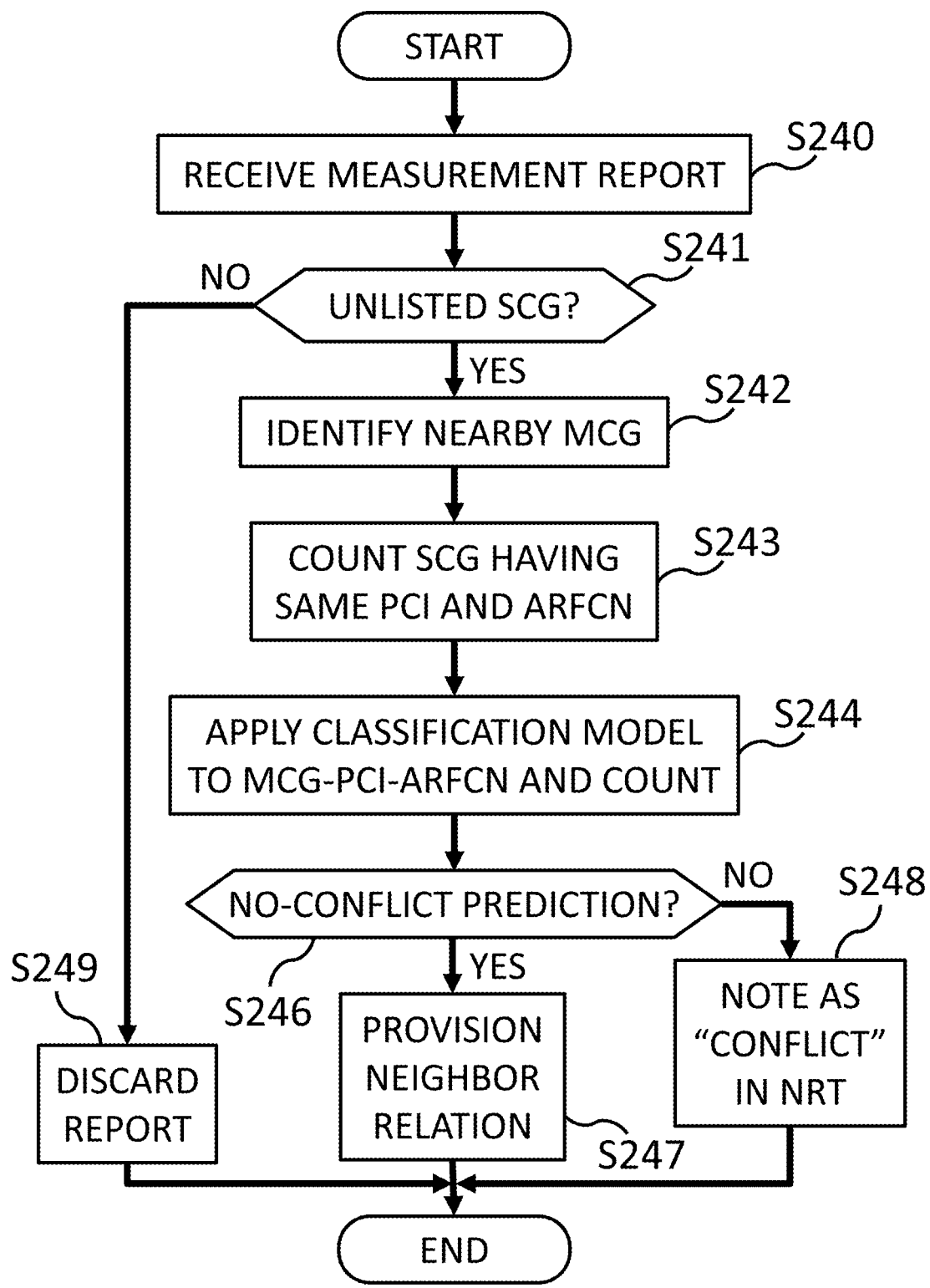
FIG. 2 is an operational flow for neighbor relation conflict prediction, according to at least one embodiment of the present invention.

FIG. 2 is an operational flow for neighbor relations conflict prediction, according to at least one embodiment of the present invention. The operational flow provides a method of neighbor relations conflict prediction. In at least some embodiments, the method is performed by a controller of an apparatus including sections for performing certain operations, such as the controller and apparatus shown in FIG. 10, which will be explained hereinafter.

At S240, the controller or a section thereof receives a measurement report. In at least some embodiments, the controller receives the measurement report, such as measurement report 131 in FIG. 1, from an MCG. In at least some embodiments, the controller receives, from a serving MCG of a terminal, a measurement report of the terminal, the measurement report including a plurality of signal measurements, each signal measurement associated with an SCG represented by a PCI and an ARFCN.

At S241, an identifying section, such as identifying section 112 shown in FIG. 1, or a sub-section thereof identifies any new SCG by PCI and ARFCN. In at least some embodiments, the identifying section identifies any PCI and ARFCN combinations not found in the neighbor relation table of the serving MCG associated with the measurement report. In at least some embodiments, the identifying section identifies any unlisted SCG among the plurality of signal measurements, the unlisted SCG represented by a PCI and an associated ARFCN that do not correspond to any single SCG in a Neighbor Relations Table (NRT) of the serving MCG. If the identifying section is able to identify any such unlisted SCG, then the operational flow proceeds to nearby MCG identification at S242. If the identifying section is unable to identify any such unlisted SCG, such as in cases where the neighbor relation table already has an entry for each SCG in the measurement report, then the operational flow proceeds to S249, where the measurement report is discarded just before the operational flow ends.

At S242, the identifying section or a sub-section thereof identifies MCG that are nearby the serving MCG in the measurement report. In at least some embodiments, the identifying section identifies one or more nearby MCG within a threshold distance of the serving MCG. In at least some embodiments, the threshold distance is 1 kilometer. In at least some embodiments, the identifying section refers to a table of nearby MCG that shows pairs of MCG with an indication of the distance and/or an indication of whether or not the distance is within the threshold distance.

At S243, a counting section, such as counting section 115 shown in FIG. 1, or a sub-section thereof counts SCG having the same PCI and ARFCN in the vicinity of the serving MCG. In at least some embodiments, the counting section counts a number of SCG in the NRT of each nearby MCG having the PCI and the ARFCN of the unlisted SCG. In at least some embodiments, the counting section increases a PCI count each time a matching SCG is found while reviewing each neighbor relations table.

At S244, an applying section of the controller or a sub-section thereof applies a classification model, such as classification model 102 shown in FIG. 1, to the final PCI count. In at least some embodiments, the applying section applies a classification model to the counted number of SCG and an MCG-PCI-ARFCN identifier representing the serving MCG, the PCI, and the ARFCN to obtain a prediction value, the prediction value being a binary value indicating whether provisioning the unlisted SCG with the serving MCG and the plurality of nearby MCG will result in PCI conflict. In at least some embodiments, the MCG-PCI-ARFCN identifier is an index value that does not form any basis for the conflict prediction. In at least some embodiments, the applying section further applies the classification model to a geographic location of the serving MCG to obtain the prediction, such that the conflict prediction is based on a PCI count and a geographic location. In at least some embodiments, the applying section further applies the classification model to a frequency type of the ARFCN to obtain the prediction, such that the conflict prediction is based on a PCI count, a geographic location, and a frequency type. In at least some embodiments, the applying section causes the classification model to output a binary prediction value representing a prediction of whether or not a PCI conflict will occur in response to provisioning the serving MCG and any nearby MCG with the 5G cell associated with the PCI and ARFCN.

At S246, the controller or a section thereof determines whether the output of the classification model indicates a prediction that a conflict will not occur. If the controller determines that the output of the classification model indicates a prediction that a conflict will not occur, then the operational flow proceeds to neighbor relation provision at S246. If the controller determines that the output of the classification model indicates a prediction that a conflict will occur, then the operational flow proceeds to "conflict" notation at S248.

At S247, the controller or a section thereof causes provisioning of the SCG with the serving and nearby MCG. In at least some embodiments, the controller causes the SCG to appear as a hand-off option in the neighbor relation table of the serving MCG and each nearby MCG. In at least some embodiments, the controller enables the serving and nearby MCG to perform hand-offs to the SCG for any connected terminals capable of EN-DC connectivity.

At S248, the controller or a section thereof causes the SCG to appear as having a "conflict" in the neighbor relation table of the serving MCG and each nearby MCG. In at least some embodiments, the controller enables the serving and nearby MCG to recognize the SCG as having a PCI conflict with the cellular network.

Figure 3:
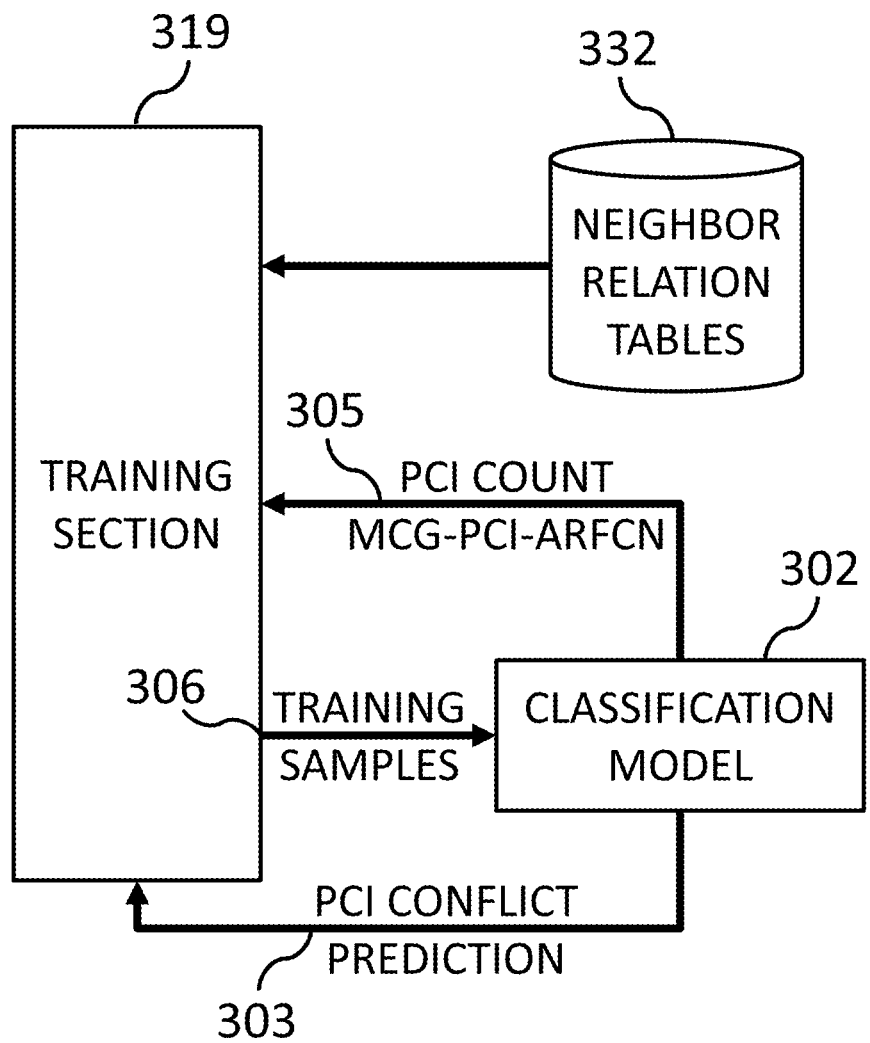
FIG. 3 is schematic diagram of data flow for continuous classification model training, according to at least one embodiment of the present invention.

FIG. 3 is schematic diagram of data flow for continuous classification model training, according to at least one embodiment of the present invention. The diagram includes a training section 319, a classification model 302, and a database of neighbor relation tables 332. In at least some embodiments, training section 319 is a component of an apparatus for neighbor relations conflict prediction, such as apparatus 100 shown in FIG. 1. Classification model 302 and database of neighbor relation tables 332 are each substantially similar in structure and function to classification model 102 and database of neighbor relation tables 132, respectively, as described with respect to FIG. 1 except where described differently.

Training section 319 is configured to train classification model 302. In at least some embodiments, training section 319 is configured to continually train classification model 302 using new training samples made by verifying predictions with updated neighbor relation tables. In at least some embodiments, training section 319 maintains a copy of input data to classification model 302, such as input data 305, such as data input at S244 shown in FIG. 2. In at least some embodiments, training section 319 is configured to check database of neighbor relation tables 332 and apply an appropriate label to the input data to form a training sample. In at least some embodiments, training section 319 is configured to train classification model 302 using a batch of new training samples, such as training samples 306, to update classification model 302.

Figure 4:
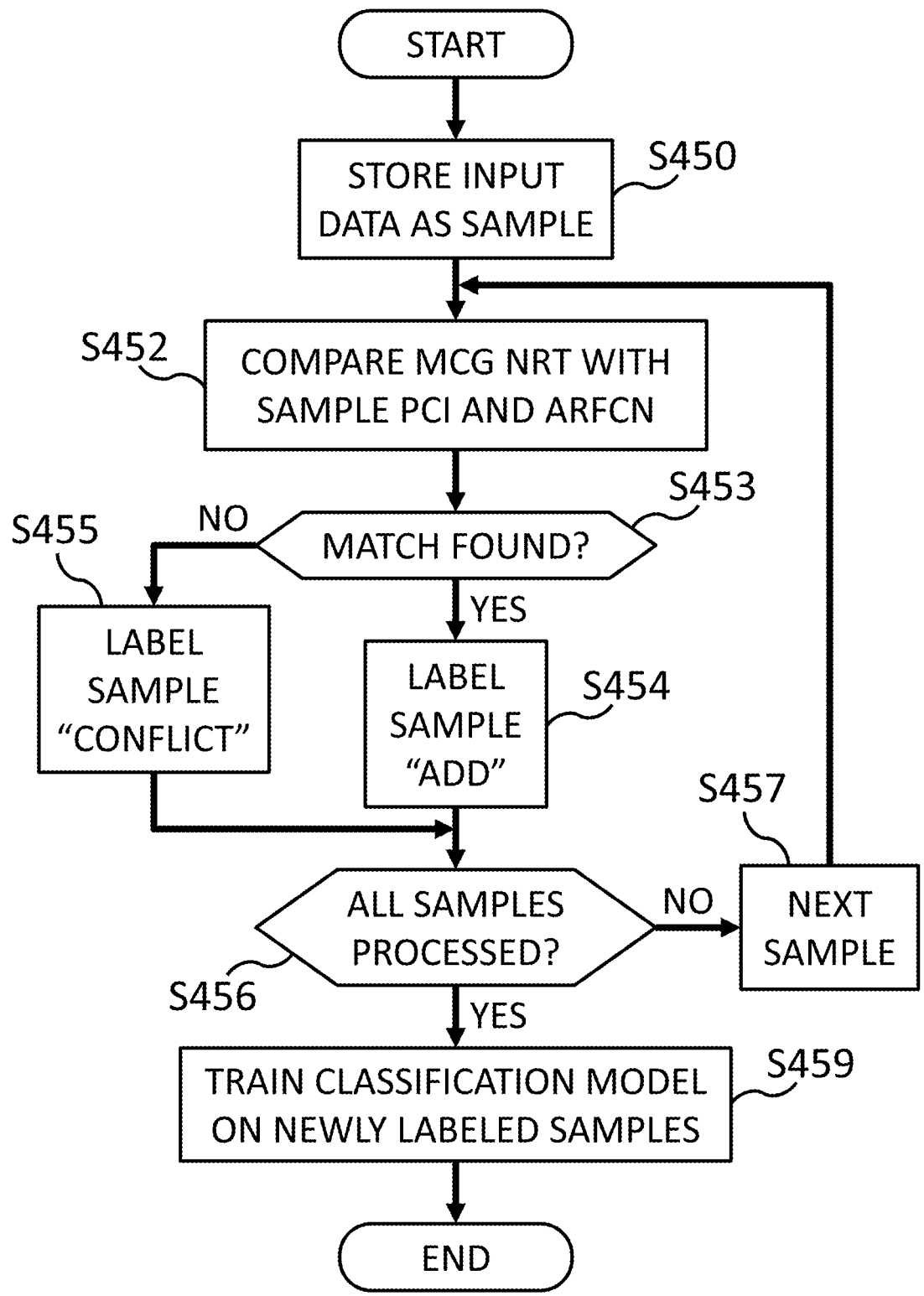
FIG. 4 is an operational flow for continuous classification model training, according to at least one embodiment of the present invention.

FIG. 4 is an operational flow for continuous classification model training, according to at least one embodiment of the present invention. The operational flow provides a method of continuous classification model training. In at least some embodiments, the method is performed by a training section, such as training section 319 shown in FIG. 3, to train a machine learning classification model, such as classification model 302 shown in FIG. 3.

At S450, the training section or a sub-section thereof stores a copy of input data to the classification model as a training sample. In at least some embodiments, the stored input data includes an MCG-PCI-ARFCN identifier and a PCI count corresponding to the identifier. In at least some embodiments, the training section stores the counted number and the MCG-PCI-ARFCN identifier as a training sample. In at least some embodiments, the stored input data further includes a geographic location and/or a frequency type.

At S452, the training section or a sub-section thereof compares the neighbor relations table of the MCG identified in the training sample with the PCI and ARFCN identified in the training sample. In at least some embodiments, the training section checks the neighbor relation table to determine whether or not the 5G cell associated with the PCI and ARFCN was provisioned into the neighbor relations table or noted as a "PCI conflict". In at least some embodiments, the comparing at S452 is not performed immediately after the storing at S450. In at least some embodiments, the comparing at S452 or the determination at S453 is performed later than the storing at S450 by a period of time ranging between one day and one week, or as long it takes for the provisioning of a neighbor table to be approved by an authority and implemented into a configuration database, such as neighbor relations tables 332 shown in FIG. 3.

At S453, the training section or a sub-section thereof determines whether a match is found in the neighbor relations table. In at least some embodiments, the training section determines whether the PCI and the ARFCN is included in the NRT of the serving MCG. If a match is found in the neighbor relations table, then the operational flow proceeds to S454, where a label indicating "add" is applied to the training sample. If a match is not found in the neighbor relations table, then the operational flow proceeds to S455, where a label indicating "conflict" is applied to the training sample. In at least some embodiments, the training section may proceed to S455 in response to determining that the neighbor relations table includes a notation that a matching 5G cell has a "PCI conflict". In at least some embodiments, the training section labels the training sample with a ground-truth prediction value indicating the determination.

In at least some embodiments, the classification model is trained once per a period of time ranging between 15 minutes and one day. In at least some embodiments, the determination at S453, the labeling at S454 or S455, and the training at S459 are performed in batches for a plurality of stored training samples per batch once per a period of time ranging between 15 minutes and one day. In at least some embodiments, each batch of training data includes tens or hundreds of stored, unlabeled training samples.

At S456, the training section or a sub-section thereof determines whether all of the stored, unlabeled training samples have been processed. If the training section determines that all of the stored, unlabeled training samples have been processed, then the operational flow proceeds to training at S459. If the training section determines that unprocessed training samples remain, then the operational flow proceeds to select the next sample at S457 before returning to the comparing at S452.

At S459, the training section or a sub-section thereof trains the classification model with one or more training samples. In at least some embodiments, the training section begins training of the classification model after all training samples of a batch have been labeled. In at least some embodiments, the training section trains the classification model with the labeled training sample resulting from the labeling at S454 and S455 before proceeding to the next sample (S457).

Figure 5:
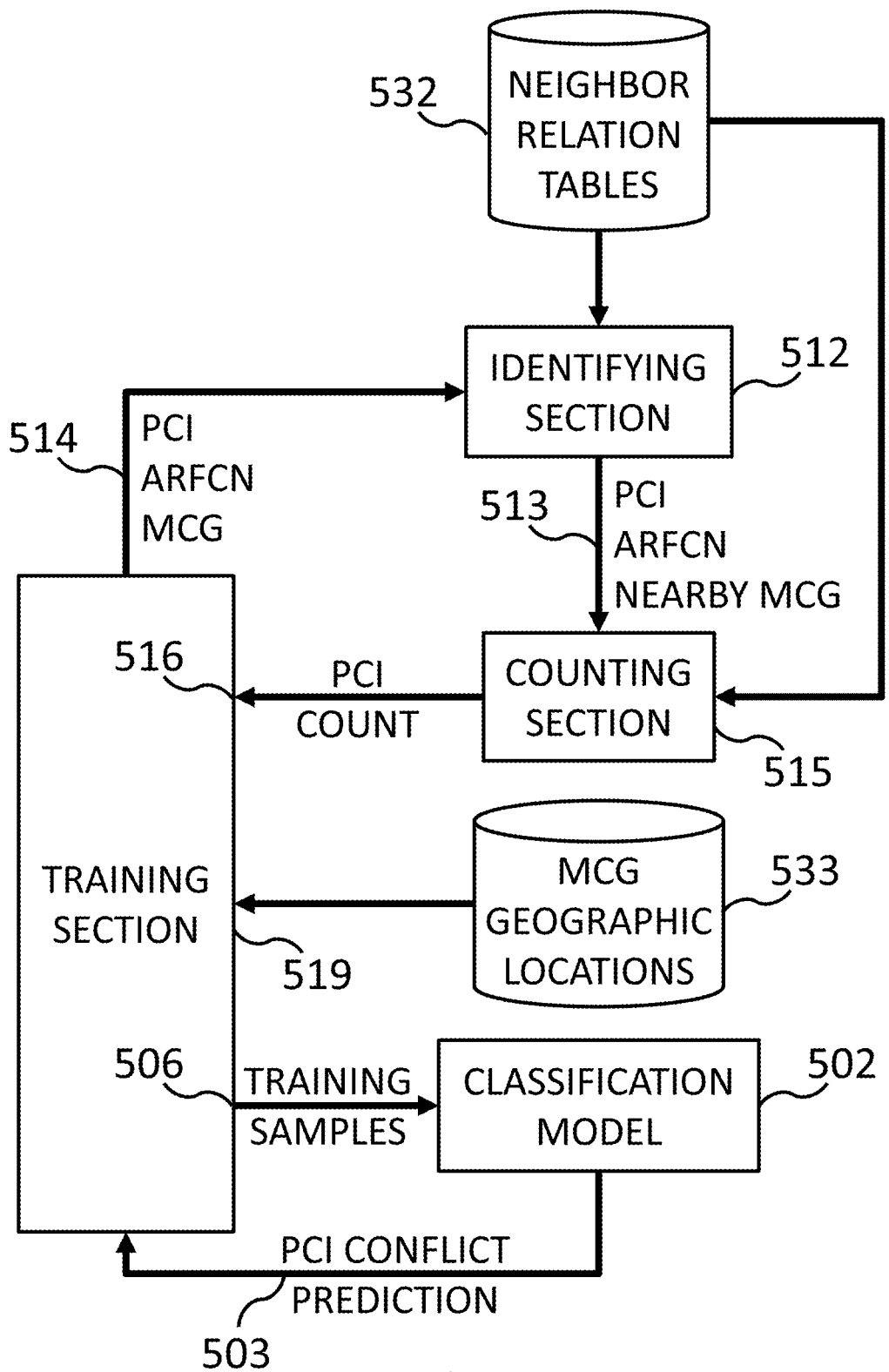
FIG. 5 is schematic diagram of data flow for initial classification model training, according to at least one embodiment of the present invention.

FIG. 5 is schematic diagram of data flow for initial classification model training, according to at least one embodiment of the present invention. The diagram includes an identifying section 512, a counting section 515, a training section 519, an initialized classification model 502, a database of neighbor relation tables 532, and a database of MCG geographic locations 533. In at least some embodiments, training section 519 is a component of an apparatus for neighbor relations conflict prediction, such as apparatus 100 shown in FIG. 1. In at least some embodiments, the functions described below of training section 519 and the functions of training section 319 described with respect to FIG. 3 are performed by a single training section of the apparatus. Identifying section 512, counting section 515, initialized classification model 502, database of neighbor relation tables 532, and database of MCG geographic locations 533 are each substantially similar in structure and function to identifying section 112, counting section 115, classification model 102, database of neighbor relation tables 132, and database of MCG geographic locations 133, respectively, as described with respect to FIG. 1 except where described differently.

Training section 519 is configured to train initialized classification model 502 for neighbor relations conflict prediction using current configuration information. In at least some embodiments, training section 519 is configured to arbitrarily select PCI-ARFCN-MCG combinations, and cause identifying section 512 and counting section 515 to provide the associated PCI count, such as PCI count 516. In at least some embodiments, training section 519 is configured to retrieve the MCG geographic location from database 533, and assemble the PCI-ARFCN-MCG, PCI count, and MCG geographic location into a training sample. In at least some embodiments, training section 519 is configured to label the training sample based on the PCI count. In at least some embodiments, training section 519 is configured to generate one or more batches of training samples, and train initialized classification model 502 using the one or more batches until classification model 502 outputs PCI conflict predictions, such as PCI conflict prediction 503, with accuracy.

Figure 6:
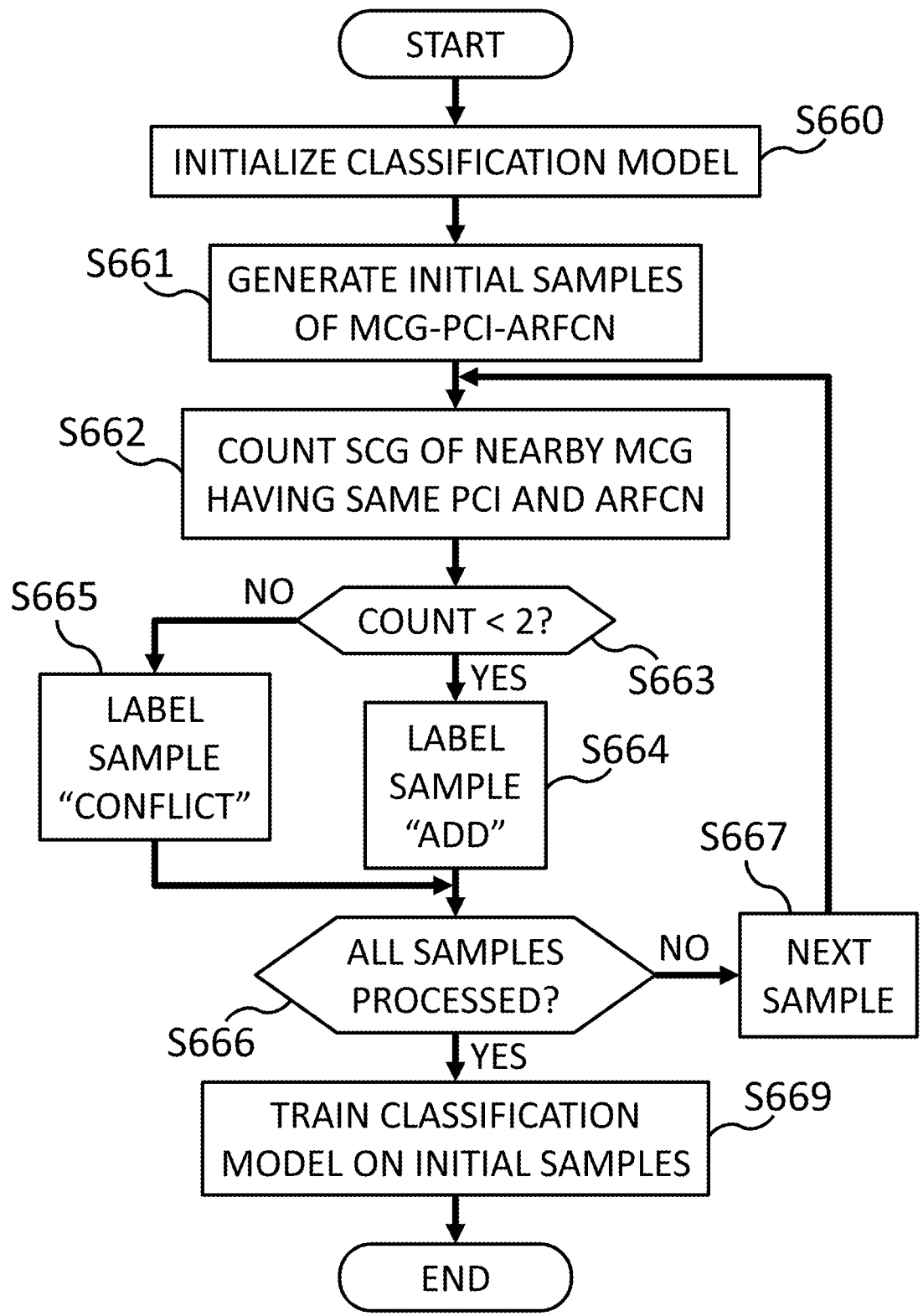
FIG. 6 is an operational flow for initial classification model training, according to at least one embodiment of the present invention.

FIG. 6 is an operational flow for initial classification model training, according to at least one embodiment of the present invention. The operational flow provides a method of initial classification model training. In at least some embodiments, the method is performed by a training section, such as training section 519 shown in FIG. 5, to train an initialized machine learning classification model, such as initialized classification model 502 shown in FIG. 5.

At S660, the training section or a sub-section thereof initializes the classification model. In at least some embodiments, the training section randomly assigns weight values to each node of the classification model to serve as a starting point for training to begin.

At S661, the training section or a sub-section thereof generates initial training samples of MCG-PCI-ARFCN combinations. In at least some embodiments, the training section generating a plurality of initial training samples, each initial training sample including an arbitrarily selected MCG-PCI-ARFCN identifier.

At S662, the training section or a sub-section thereof counts matching SCG provisioned in neighbor relation tables of MCG that are nearby the MCG identified in the training sample. In at least some embodiments, the training section causes the identification section to identify, for each initial training sample, one or more nearby MCG within the threshold distance of the MCG represented by the MCG-PCI-ARFCN identifier. In at least some embodiments, the training section causes the counting section to count, for each initial training sample, a number of SCG in the NRT of each nearby MCG having the PCI and the ARFCN represented by the MCG-PCI-ARFCN identifier. In at least some embodiments, the training section receives a PCI count from the counting section.

At S663, the training section or a subsection thereof determines whether the PCI count resulting from counting at S662 is less than a threshold PCI count. In at least some embodiments, the threshold PCI count is two. If the PCI count is less than the threshold PCI count, then the operational flow proceeds to S664, where a label indicating "add" is applied to the training sample. If the PCI count is not less than two, then the operational flow proceeds to S665, where a label indicating "conflict" is applied to the training sample. In at least some embodiments, the training section labels the training sample with one of a ground-truth prediction value indicating PCI conflict in response to the counted number being not less than a threshold count and a ground-truth prediction value indicating no PCI conflict in response to the counted number being less than the threshold count.

At S666, the training section or a sub-section thereof determines whether all of the training samples generated at S661 have been processed. If the training section determines that all of the training samples generated at S661 have been processed, then the operational flow proceeds to training at S669. If the training section determines that unprocessed training samples remain, then the operational flow proceeds to select the next sample at S667 before returning to the counting at S662.

At S669, the training section or a sub-section thereof trains the initialized classification model with the plurality of training samples generated at S661.

Figure 7:
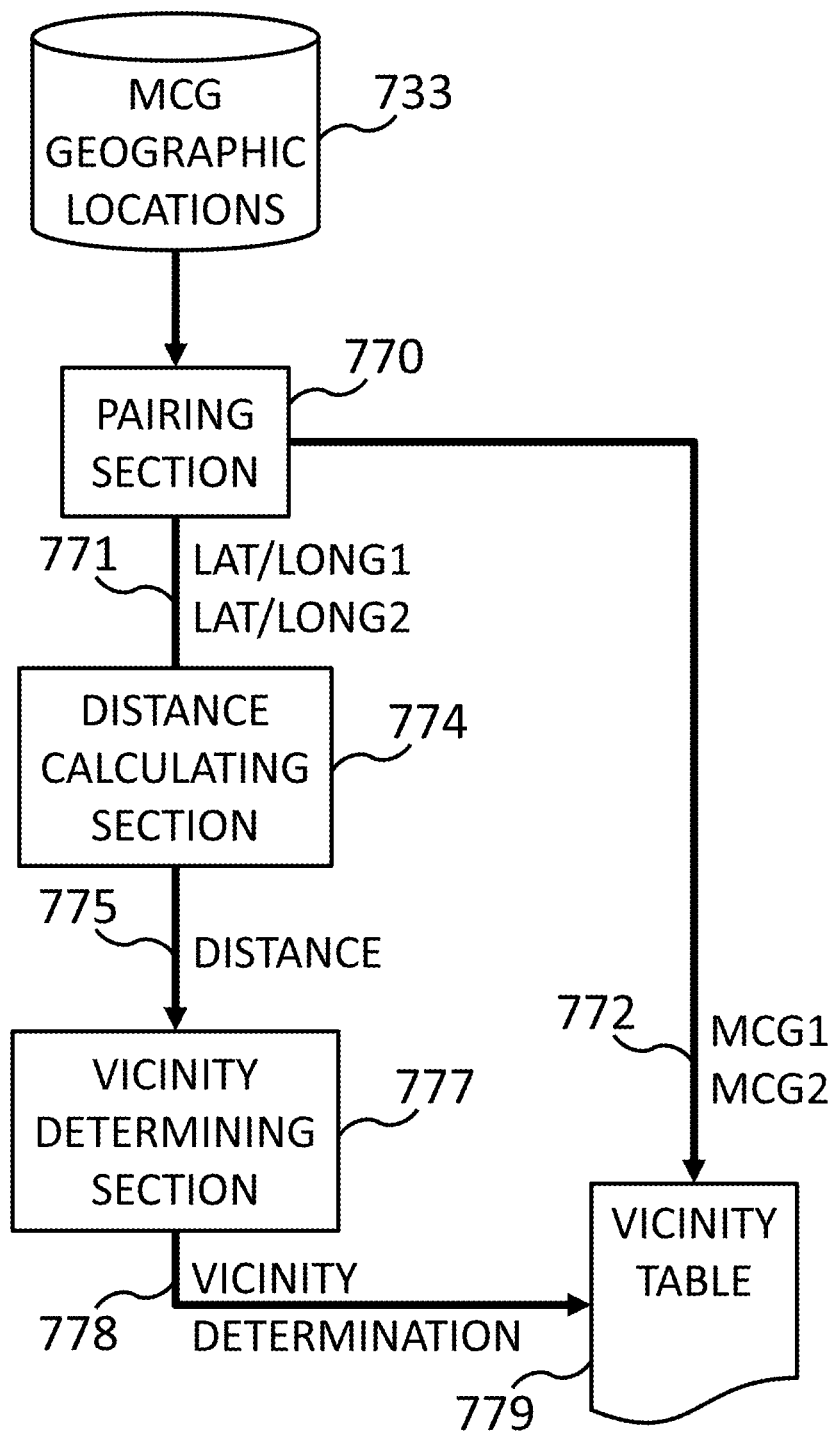
FIG. 7 is a schematic diagram of data flow for vicinity table population, according to at least one embodiment of the present invention.

FIG. 7 is a schematic diagram of data flow for vicinity table population, according to at least one embodiment of the present invention. The diagram includes a pairing section 770, a distance calculating section 774, a vicinity determining section 777, a vicinity table 779, and a database of MCG geographic locations 733. In at least some embodiments, pairing section 770, distance calculating section 774, vicinity determining section 777, and vicinity table 779 are included in an identifying section of an apparatus, such as identifying section 112 and apparatus 100 shown in FIG. 1. Database of MCG geographic locations 733 is substantially similar in structure and function to database of MCG geographic locations 133 as described with respect to FIG. 1 except where described differently.

Pairing section 770 is configured to pair one MCG with another MCG from among a plurality of MCG in a cellular network. In at least some embodiments, pairing section 770 pairs each MCG with each other MCG until all possible combinations of MCG exist in an MCG pairing. In at least some embodiments, pairing section retrieves the geographic locations of each MCG in the MCG pairing, and outputs the geographic locations, such as geographic locations 771, to distance calculating section 774. In at least some embodiments, each geographic location is represented as a latitude and a longitude. In at least some embodiments, pairing section 770 is configured to record the MCG pairing, such as MCG pairing 772, to vicinity table 779.

Distance calculating section 774 is configured to calculate the distance between two geographic locations. In at least some embodiments, distance calculating section 774 is configured to receive two geographic locations, such as geographic locations 771, from pairing section 770. In at least some embodiments, distance calculating section 774 is configured to apply Pythagorean's theorem to the difference between latitudes and the difference between longitudes of two geographic locations. In at least some embodiments, distance calculating section 774 is configured to output the resulting distance, such as distance 775, to vicinity determining section 777.

Vicinity determining section 777 is configured to determine whether the MCG in the MCG pairing are located near each other for purposes of neighbor relation conflict prediction. In at least some embodiments, vicinity determining section 777 is configured to receive a distance, such as distance 775, from distance calculating section 774. In at least some embodiments, vicinity determining section 777 is configured to determine whether the distance is within a threshold distance. In at least some embodiments, vicinity determining section 777 is configured to apply the distance to a machine learning regression model trained to relate distances to determinations of MCG being located near each other. In at least some embodiments, vicinity determining section 777 is configured to record a determination of whether the pair of MCG are located near each other, such as vicinity determination 778, to vicinity table 779 in association with the MCG pairing, such as MCG pairing 772.

Figure 8:
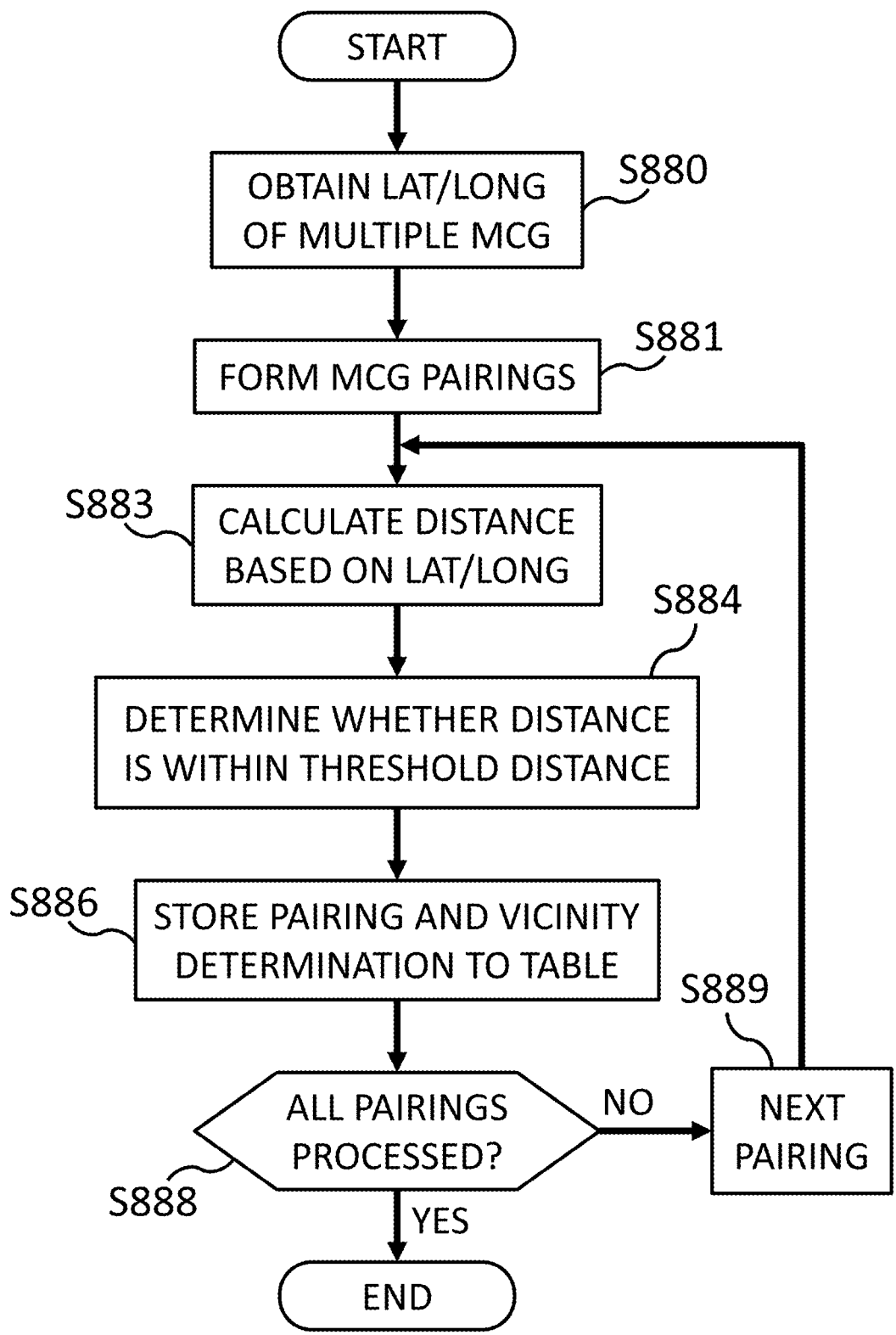
FIG. 8 is an operational flow for vicinity table population, according to at least one embodiment of the present invention.

FIG. 8 is an operational flow for vicinity table population, according to at least one embodiment of the present invention. The operational flow provides a method of vicinity table population. In at least some embodiments, the method is performed by an identifying section, such as identifying section 112 shown in FIG. 1.

At S880, the identifying section or a sub-section thereof obtains a geographic location for each of a plurality of MCG in a cellular network. In at least some embodiments, the identifying section obtains a latitude and longitude for each MCG in the cellular network.

At S881, the identifying section or a sub-section thereof forms a plurality of MCG pairings, each pairing including two MCG in the cellular network. In at least some embodiments, the identifying section forms a plurality of MCG pairings, each MCG pairing including a first MCG among the plurality of MCG and a second MCG among the plurality of MCG. In at least some embodiments, the identifying section pairs each MCG with each other MCG until all possible combinations of MCG in the cellular network exist in an MCG pairing.

At S883, the identifying section or a sub-section thereof calculates a distance between the geographic locations of an MCG pairing. In at least some embodiments, the identifying section calculates, for each MCG pairing, a distance between the first MCG and the second MCG based on the geographic location of the first MCG and the geographic location of the second MCG. In at least some embodiments, the identifying section applies Pythagorean's theorem to the difference between latitudes and the difference between longitudes of the geographic locations of the MCG pairing.

At S884, the identifying section or a sub-section thereof determines whether the distance calculated at S883 is within a threshold distance. In at least some embodiments, the identifying section applies a machine learning regression model trained to relate distances to determinations of MCG being located near each other to the distance calculated at S883. In at least some embodiments, the identifying section applies a regression model to the calculated distance to obtain a vicinity value, the vicinity value being a binary value indicating whether the calculated distance is within the threshold distance.

At S886, the identifying section or a sub-section thereof adds the MCG pairing and the result of the vicinity determination at S884 to a table, such as vicinity table 779 shown in FIG. 7. In at least some embodiments, the identifying section stores data representing the first MCG in correspondence with the second MCG, the geographic location of the first MCG, and the vicinity value. In at least some embodiments, the identifying section records a determination of whether the pairing of MCG are located near each other to the vicinity table in association with the MCG pairing. In at least some embodiments, the identifying section stores the vicinity table in a manner in which identification of the one or more nearby MCG is performed by accessing the stored data to retrieve one or more second MCG corresponding to the serving MCG as the stored first MCG and the vicinity value representing that the calculated distance is within the threshold distance.

At S888, the identifying section or a sub-section thereof determines whether all pairings have been processed. If the identifying section determines that unprocessed MCG pairings remain, then the operational flow proceeds to select the next pairing at S889 before returning to distance calculation at S883. If the identifying section determines that all MCG pairings have been processed, then the operational flow ends.

In at least some embodiments, the identifying section performs the obtaining at S880, the forming at S881, and the iterations of the calculating at S883 and the storing at S886 are performed once per a period of time ranging between 6 hours and one week to keep the vicinity table updated.

Figure 9:
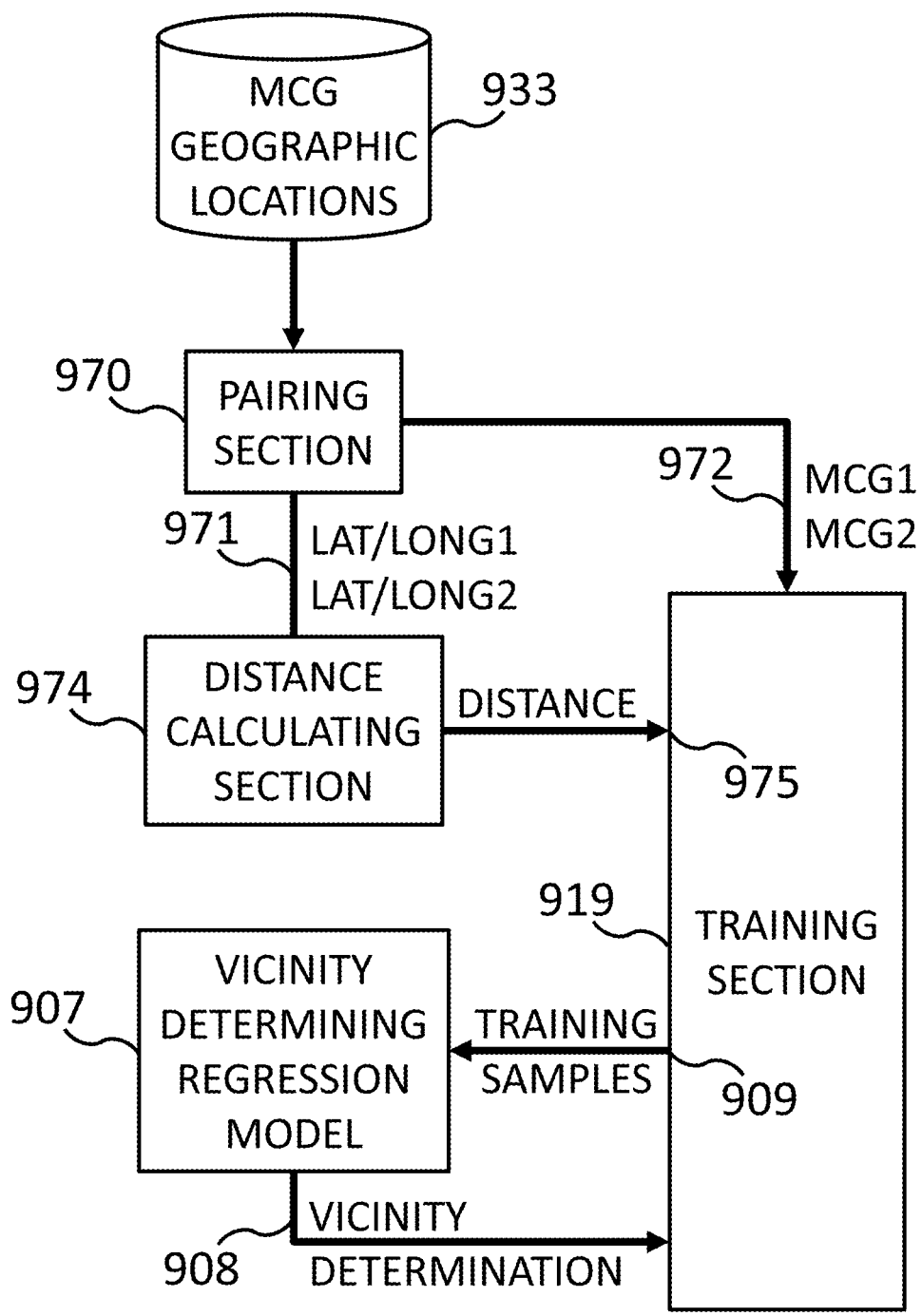
FIG. 9 is a schematic diagram of data flow for vicinity determining regression model training, according to at least one embodiment of the present invention.

FIG. 9 is a schematic diagram of data flow for vicinity determining regression model training, according to at least one embodiment of the present invention. The diagram includes a pairing section 970, a distance calculating section 974, a vicinity determining regression model 907, a training section 919, and a database of MCG geographic locations 933. In at least some embodiments, training section 919 is a component of an apparatus for neighbor relations conflict prediction, such as apparatus 100 shown in FIG. 1. In at least some embodiments, the functions described below of training section 919 and the functions of training section 319 described with respect to FIG. 3 and training section 519 described with respect to FIG. 5 are performed by a single training section of the apparatus. Pairing section 970 and distance calculating section 974 are each substantially similar in structure and function to pairing section 770 and distance calculating section 774, respectively, as described with respect to FIG. 7 except where described differently. Database of MCG geographic locations 933 is substantially similar in structure and function to database of MCG geographic locations 133 as described with respect to FIG. 1 except where described differently.

Vicinity determining regression model 907 is a machine learning model trained to relate distances to determinations of MCG being located near each other. In at least some embodiments, vicinity determining regression model 907 receives a distance as input. In at least some embodiments, vicinity determining regression model 907 receives an MCG pairing as an index value of the input. In at least some embodiments, vicinity determining regression model 907 outputs a binary value indicating whether the calculated distance is within the threshold distance. In at least some embodiments, vicinity determining regression model 907 is a logistic regression machine learning model trained using a one-vs-rest scheme.

Training section 919 is configured to train vicinity determining regression model 907 to relate distances to determinations of MCG being located near each other. In at least some embodiments, training section 919 is configured to receive MCG pairings, such as MCG pairing 972 from pairing section 970. In at least some embodiments, training section 919 is configured to receive distances, such as distance 975, associated with MCG pairings from distance calculating section 974, and assemble the distance and MCG pairing into a training sample. In at least some embodiments, training section 919 is configured to label the training sample based on the distance. In at least some embodiments, training section 919 is configured to assemble training samples of all MCG pairings, and train vicinity determining regression model 907 in one or more batches of all MCG pairings until vicinity determining regression model 907 outputs vicinity determinations, such as vicinity determination 908, with accuracy.

Figure 10:
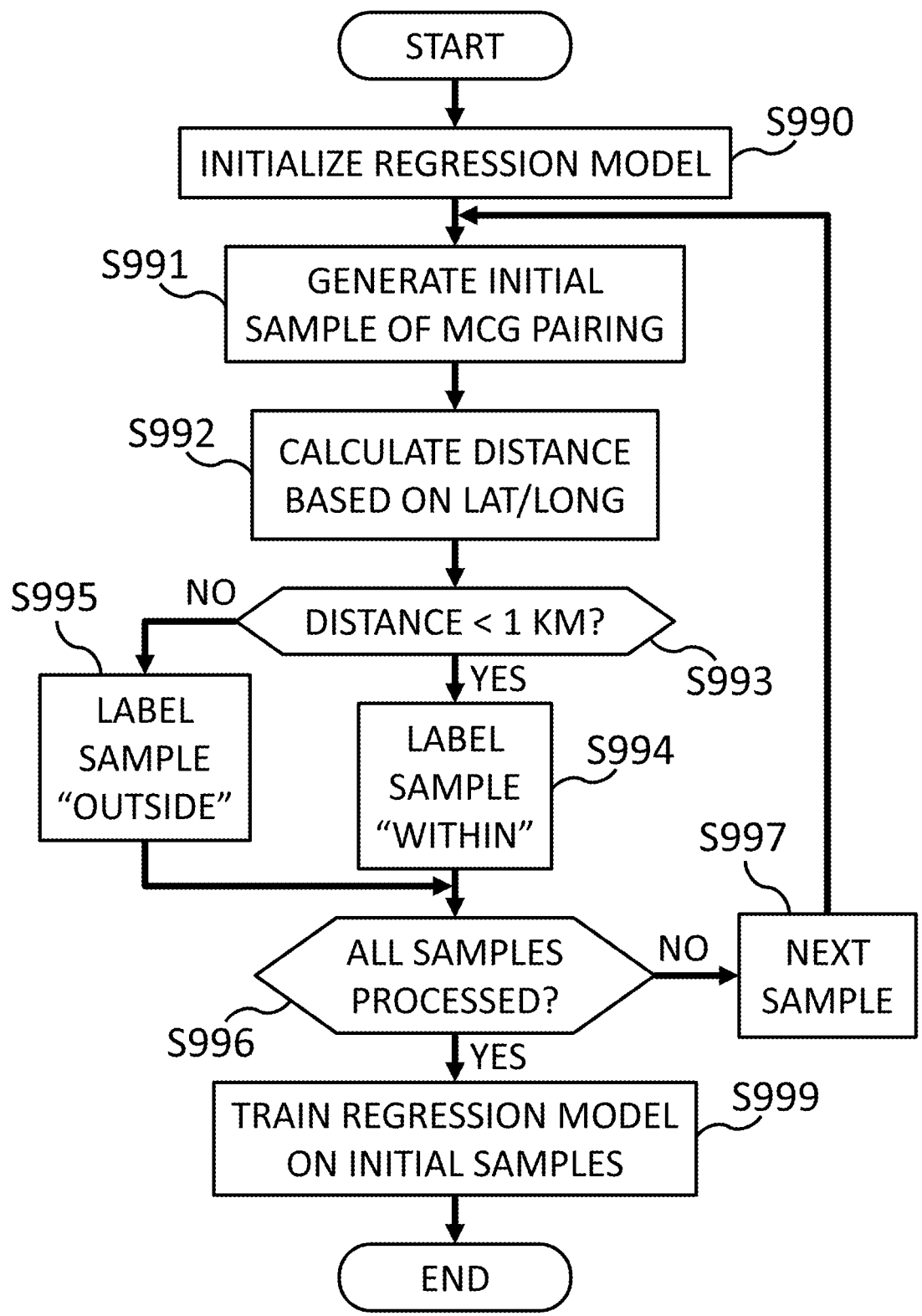
FIG. 10 is an operational flow for vicinity determining regression model training, according to at least one embodiment of the present invention.

FIG. 10 is an operational flow for vicinity determining regression model training, according to at least one embodiment of the present invention. The operational flow provides a method of initial regression model training. In at least some embodiments, the method is performed by a training section, such as training section 919 shown in FIG. 9, to train an initialized machine learning regression model, such as vicinity determining regression model 907 shown in FIG. 9.

At S990, the training section or a sub-section thereof initializes the regression model. In at least some embodiments, the training section randomly assigns weight values to each node of the regression model to serve as a starting point for training to begin.

At S991, the training section or a sub-section thereof generates an initial training sample of an MCG pairing. In at least some embodiments, as iterations of S991 proceed, the training section generates a plurality of initial training samples, each training sample including a pairing among the plurality of pairings.

At S992, the training section or a sub-section thereof calculates a distance between the geographic locations of an MCG pairing. In at least some embodiments, the training section causes the identifying section to apply Pythagorean's theorem to the difference between latitudes and the difference between longitudes of the geographic locations of the MCG pairing.

At S993, the training section or a sub-section thereof determines whether the distance calculated at S992 is within a threshold distance. In at least some embodiments, the threshold distance is 1 kilometer. If the calculated distance is less than the threshold distance, then the operational flow proceeds to S994, where a label indicating "within" is applied to the training sample. If the calculated distance is not less than 1 kilometer, then the operational flow proceeds to S995, where a label indicating "outside" is applied to the training sample. In at least some embodiments, the training section labels each training sample with a ground-truth vicinity value indicating whether the calculated distance is within the threshold distance.

At S996, the training section or a sub-section thereof determines whether all of the training samples generated at iterations of S991 for each MCG pairing have been processed. If the training section determines that all of the training samples for all MCG pairings have been processed, then the operational flow proceeds to training at S999. If the training section determines that unprocessed training samples remain, then the operational flow proceeds to select the next training sample at S997 before returning to the generating at S991.

At S999, the training section or a sub-section thereof trains the initialized regression model with the plurality of training samples generated at iterations of S991.

Figure 11:
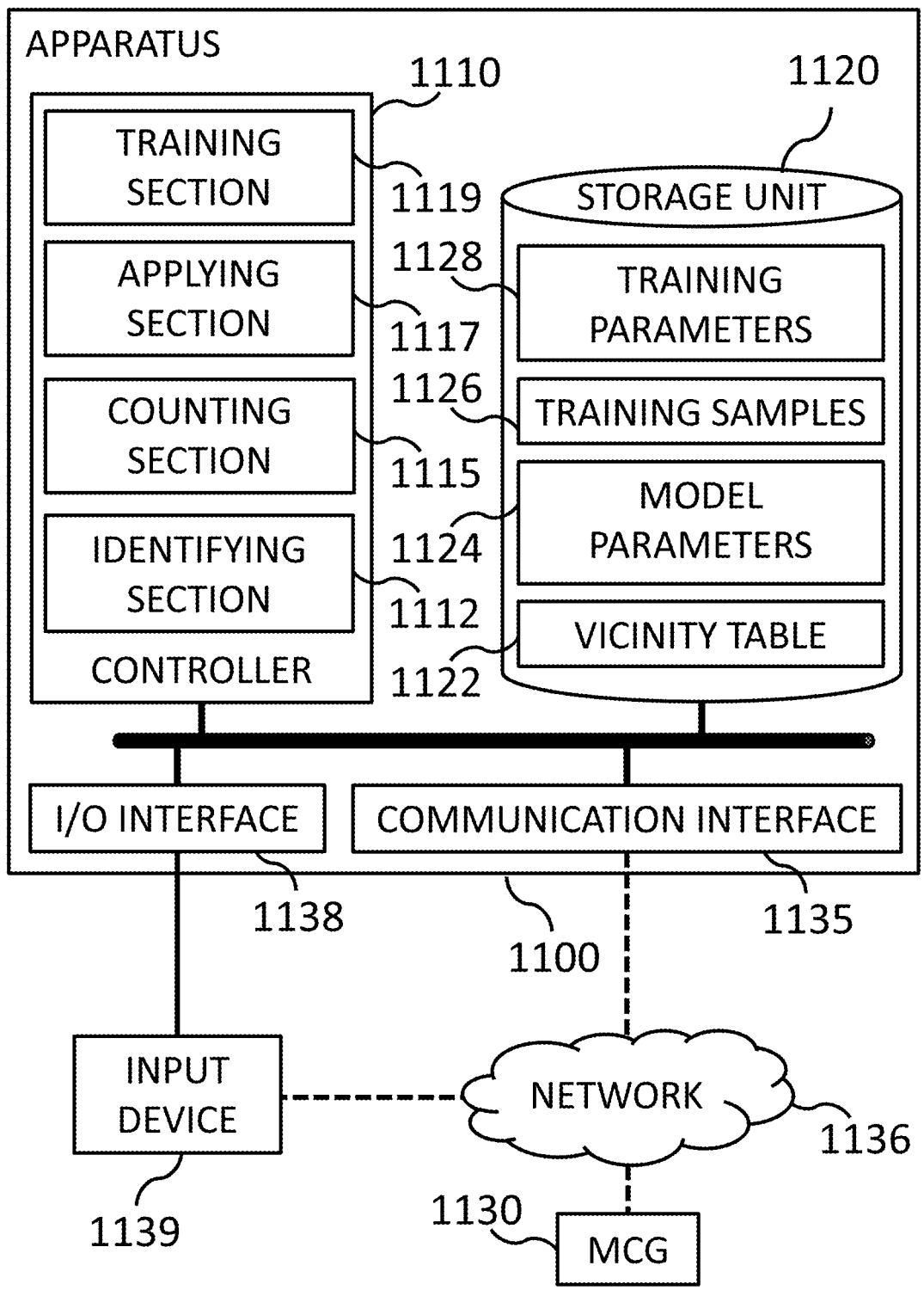
FIG. 11 is a block diagram of an exemplary hardware configuration for neighbor relation conflict prediction, according to at least one embodiment of the present invention.

FIG. 11 is a block diagram of an exemplary hardware configuration for neighbor relations conflict prediction, according to at least one embodiment of the present invention.

The exemplary hardware configuration includes apparatus 1100, which communicates with network 1136, and interacts with input device 1139. Apparatus 1100 may be a computer or other computing device that receives input or commands from input device 1139. Apparatus 1100 may be a host server that connects directly to input device 1139, or indirectly through network 1136. In some embodiments, apparatus 1100 is a computer system that includes two or more computers. In some embodiments, apparatus 1100 is a personal computer that executes an application for a user of apparatus 1100.

Apparatus 1100 includes a controller 1110, a storage unit 1120, a communication interface 1135, and an input/output interface 1138. In some embodiments, controller 1110 includes a processor or programmable circuitry executing instructions to cause the processor or programmable circuitry to perform operations according to the instructions. In some embodiments, controller 1110 includes analog or digital programmable circuitry, or any combination thereof. In some embodiments, controller 1110 includes physically separated storage or circuitry that interacts through communication. In some embodiments, storage unit 1120 includes a non-volatile computer-readable medium capable of storing executable and non-executable data for access by controller 1110 during execution of the instructions. Communication interface 1135 transmits and receives data from network 1136, which allows communication with MCG 1130. Input/output interface 1138 connects to various input and output units via a parallel port, a serial port, a keyboard port, a mouse port, a monitor port, and the like to accept commands and present information.

Controller 1110 includes identifying section 1112, counting section 1115, applying section 1117, and training section 1119. Storage unit 1120 includes vicinity table 1122, model parameters 1124, training samples 1126, and training parameters 1128.

Identifying section 1112 is the circuitry or instructions of controller 1110 configured to identify unlisted SCG from measurement reports and nearby MCG. In at least some embodiments, identifying section 1112 is configured to compare measurement reports with neighbor relation tables to identify any PCI and ARFCN combinations not found in the neighbor relation table of the serving MCG associated with the measurement report. In at least some embodiments, identifying section 1112 utilizes information in storage unit 1120, such as vicinity 1122. In at least some embodiments, identifying section 1112 includes sub-sections for performing additional functions, as described in the foregoing flow charts. In at least some embodiments, such sub-sections may be referred to by a name associated with their function.

Counting section 1115 is the circuitry or instructions of controller 1110 configured to count matching SCG. In at least some embodiments, counting section 1115 is configured to count existing 5G cells having the same PCI and ARFCN in the vicinity of a serving MCG, such as MCG 1130. In at least some embodiments, counting section 1115 utilizes information in databases in communication with apparatus 1100. In at least some embodiments, counting section 1115 includes sub-sections for performing additional functions, as described in the foregoing flow charts. In at least some embodiments, such sub-sections may be referred to by a name associated with their function.

Applying section 1117 is the circuitry or instructions of controller 1110 configured to apply models to input data to obtain output data. In at least some embodiments, applying section 1117 is configured to feed the input data to an input layer of the model, calculate intermediate values of intermediate layers, and read the output data from an output layer of the model. In at least some embodiments, applying section 1117 utilizes information in storage unit 1120, such as model parameters 1124. In at least some embodiments, applying section 1117 includes sub-sections for performing additional functions, as described in the foregoing flow charts. In at least some embodiments, such sub-sections may be referred to by a name associated with their function.

Training section 1119 is the circuitry or instructions of controller 1110 configured to train models. In at least some embodiments, training section 1119 is configured to adjust weights of models based on a loss function until the loss function converges on a solution or the training is otherwise deemed complete. In at least some embodiments, training section 1119 stores information in training samples 11126, and utilizes information in storage unit 1120, such as model parameters 1124 and training parameters 1128. In at least some embodiments, training section 1119 includes sub-sections for performing additional functions, as described in the foregoing flow charts. In at least some embodiments, such sub-sections are referred to by a name associated with the corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, neighbor relation conflict prediction is performed by operations including receiving, from a serving Master Cell Group (MCG) of a terminal, a measurement report of the terminal, the measurement report including a plurality of signal measurements, each signal measurement associated with a Secondary Cell Group (SCG) represented by a Physical Cell Identifier (PCI) and an Absolute Radio-Frequency Channel Number (ARFCN), identifying an unlisted SCG among the plurality of signal measurements, the unlisted SCG represented by a PCI and an associated ARFCN that do not correspond to any single SCG in a Neighbor Relations Table (NRT) of the serving MCG, identifying one or more nearby MCG within a threshold distance of the serving MCG, counting a number of SCG in the NRT of each nearby MCG having the PCI and the ARFCN of the unlisted SCG, applying a classification model to the counted number of SCG and an MCG-PCI-ARFCN identifier representing the serving MCG, the PCI, and the ARFCN to obtain a prediction value, the prediction value being a binary value indicating whether provisioning the unlisted SCG with the serving MCG and the plurality of nearby MCG will result in PCI conflict.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable storage medium including instructions executable by a computer to cause the computer to perform operations comprising:
   receiving, from a serving Master Cell Group (MCG) of a terminal, a measurement report of the terminal, the measurement report including a plurality of signal measurements, each signal measurement associated with a Secondary Cell Group (SCG) represented by a Physical Cell Identifier (PCI) and an Absolute Radio-Frequency Channel Number (ARFCN);
   identifying an unlisted SCG among the plurality of signal measurements, the unlisted SCG represented by a PCI and an associated ARFCN that do not correspond to any single SCG in a Neighbor Relations Table (NRT) of the serving MCG;
   identifying one or more nearby MCG within a threshold distance of the serving MCG;
   counting a number of SCG in the NRT of each nearby MCG having the PCI and the ARFCN of the unlisted SCG; and
   applying a classification model to the counted number of SCG and an MCG-PCI-ARFCN identifier representing the serving MCG, the PCI, and the ARFCN to obtain a prediction value, the prediction value being a binary value indicating whether provisioning the unlisted SCG with the serving MCG and the plurality of nearby MCG will result in PCI conflict.

2. The computer-readable storage medium of claim 1, wherein the instructions are further configured to cause the computer to perform applying the classification model to at least one of a geographic location of the serving MCG or a frequency type of the ARFCN to obtain the prediction.

3. The computer-readable storage medium of claim 1, wherein the instructions are further configured to cause the computer to perform:
   storing the counted number and the MCG-PCI-ARFCN identifier as a training sample;
   determining whether the PCI and the ARFCN are included in the NRT of the serving MCG;
   labeling the training sample with a ground-truth prediction value indicating the determination; and
   training the classification model with the labeled training sample.

4. The computer-readable storage medium of claim 3, wherein the determining is performed a period of time after the storing, wherein the period of time ranges between one and ten days.

5. The computer-readable storage medium of claim 3, wherein
   the determining, labeling, and training are performed in batches for a plurality of stored training samples per batch once per a period of time ranging between 15 minutes and one day.

6. The computer-readable storage medium of claim 3, wherein the instructions are further configured to cause the computer to perform:
   initializing the classification model;
   generating a plurality of initial training samples, each of the plurality of initial training samples including an arbitrarily selected MCG-PCI-ARFCN identifier;
   identifying, for each of the plurality of initial training samples, one or more nearby MCG within the threshold distance of the MCG represented by the MCG-PCI-ARFCN identifier;
   counting, for each of the plurality of initial training samples, a number of SCG in the NRT of each nearby MCG having the PCI and the ARFCN represented by the MCG-PCI-ARFCN identifier;
   labeling the training sample with one of a ground-truth prediction value indicating PCI conflict in response to the counted number being not less than a threshold count or a ground-truth prediction value indicating no PCI conflict in response to the counted number being less than the threshold count; and
   training the initialized classification model with the plurality of initial training samples.

7. The computer-readable storage medium of claim 1, wherein the classification model is a support vector machine classification model.

8. The computer-readable storage medium of claim 1, wherein the instructions are further configured to cause the computer to perform:
   obtaining a geographic location for each of a plurality of MCG in a cellular network;
   forming a plurality of MCG pairings, each of the plurality of MCG pairings including a first MCG among the plurality of MCG and a second MCG among the plurality of MCG;
   calculating, for each of the plurality of MCG pairings, a distance between the first MCG and the second MCG based on the geographic location of the first MCG and the geographic location of the second MCG; and
   storing data representing the first MCG in correspondence with the second MCG, the geographic location of the first MCG, and a vicinity value, the vicinity value being a binary value indicating whether the calculated distance is within the threshold distance;
   wherein the identifying the one or more nearby MCG includes accessing the stored data to retrieve one or more second MCG corresponding to the serving MCG as the stored first MCG and the vicinity value representing that the calculated distance is within the threshold distance.

9. The computer-readable storage medium of claim 8, wherein the obtaining, forming, calculating, and storing are performed once per a period of time ranging between 6 hours and one week.

10. The computer-readable storage medium of claim 8, wherein the instructions are further configured to cause the computer to perform applying a regression model to the calculated distance to obtain the vicinity value.

11. The computer-readable storage medium of claim 10, wherein the instructions are further configured to cause the computer to perform:
   initializing the regression model;
   generating a plurality of initial training samples, each of the plurality of initial training samples including a pairing among the plurality of pairings;
   labeling each of the plurality of initial training samples with a ground-truth vicinity value indicating whether the calculated distance is within the threshold distance; and
   training the initialized regression model with the plurality of initial training samples.

12. A method comprising:
   receiving, from a serving Master Cell Group (MCG) of a terminal, a measurement report of the terminal, the measurement report including a plurality of signal measurements, each signal measurement associated with a Secondary Cell Group (SCG) represented by a Physical Cell Identifier (PCI) and an Absolute Radio-Frequency Channel Number (ARFCN);
   identifying an unlisted SCG among the plurality of signal measurements, the unlisted SCG represented by a PCI and an associated ARFCN that do not correspond to any single SCG in a Neighbor Relations Table (NRT) of the serving MCG;
   identifying one or more nearby MCG within a threshold distance of the serving MCG;
   counting a number of SCG in the NRT of each nearby MCG having the PCI and the ARFCN of the unlisted SCG; and
   applying a classification model to the counted number of SCG and an MCG-PCI-ARFCN identifier representing the serving MCG, the PCI, and the ARFCN to obtain a prediction value, the prediction value being a binary value indicating whether provisioning the unlisted SCG with the serving MCG and the plurality of nearby MCG will result in PCI conflict.

13. The method of claim 12, wherein the applying includes further applying the classification model to at least one of a geographic location of the serving MCG or a frequency type of the ARFCN to obtain the prediction.

14. The method of claim 12, further comprising
   storing the counted number and the MCG-PCI-ARFCN identifier as a training sample;
   determining whether the PCI and the ARFCN are included in the NRT of the serving MCG;
   labeling the training sample with a ground-truth prediction value indicating the determination; and
   training the classification model with the labeled training sample.

15. The method of claim 14, wherein the determining is performed a period of time after the storing, wherein the period of time ranges between one and ten days.

16. The method of claim 14, wherein
the determining, labeling, and training are performed in batches for a plurality of stored training samples per batch once per a period of time ranging between 15 minutes and one day.

17. The method of claim 14, further comprising
initializing the classification model;
generating a plurality of initial training samples, each of the plurality of initial training samples including an arbitrarily selected MCG-PCI-ARFCN identifier;
identifying, for each of the plurality of initial training samples, one or more nearby MCG within the threshold distance of the MCG represented by the MCG-PCI-ARFCN identifier;
counting, for each of the plurality of initial training samples, a number of SCG in the NRT of each nearby MCG having the PCI and the ARFCN represented by the MCG-PCI-ARFCN identifier;
labeling the training sample with one of a ground-truth prediction value indicating PCI conflict in response to the counted number being not less than a threshold count and a ground-truth prediction value indicating no PCI conflict in response to the counted number being less than the threshold count; and
training the initialized classification model with the plurality of initial training samples.

18. The method of claim 12, wherein the classification model is a support vector machine classification model.

19. The method of claim 12, further comprising:
obtaining a geographic location for each of a plurality of MCG in a cellular network;
forming a plurality of MCG pairings, each of the plurality of MCG pairings including a first MCG among the plurality of MCG and a second MCG among the plurality of MCG;
calculating, for each of the plurality of MCG pairings, a distance between the first MCG and the second MCG based on the geographic location of the first MCG and the geographic location of the second MCG; and
storing data representing the first MCG in correspondence with the second MCG, the geographic location of the first MCG, and a vicinity value, the vicinity value being a binary value indicating whether the calculated distance is within the threshold distance;
wherein the identifying the one or more nearby MCG includes accessing the stored data to retrieve one or more second MCG corresponding to the serving MCG as the stored first MCG and the vicinity value representing that the calculated distance is within the threshold distance.

20. An apparatus comprising:
a controller including circuitry configured to
   receive, from a serving Master Cell Group (MCG) of a terminal, a measurement report of the terminal, the measurement report including a plurality of signal measurements, each signal measurement associated with a Secondary Cell Group (SCG) represented by a Physical Cell Identifier (PCI) and an Absolute Radio-Frequency Channel Number (ARFCN);
   identify an unlisted SCG among the plurality of signal measurements, the unlisted SCG represented by a PCI and an associated ARFCN that do not correspond to any single SCG in a Neighbor Relations Table (NRT) of the serving MCG;
   identify one or more nearby MCG within a threshold distance of the serving MCG;

count a number of SCG in the NRT of each nearby MCG having the PCI and the ARFCN of the unlisted SCG; and apply a classification model to the counted number of SCG and an MCG-PCI-ARFCN identifier representing the serving MCG, the PCI, and the ARFCN to obtain a prediction value, the prediction value being a binary value indicating whether provisioning the unlisted SCG with the serving MCG and the plurality of nearby MCG will result in PCI conflict.

* * * * *